(12) United States Patent
Gajanana et al.

(10) Patent No.: US 8,508,892 B2
(45) Date of Patent: Aug. 13, 2013

(54) INTEGRATED CIRCUIT WITH DC-DC CONVERTER AND ESD PROTECTION

(75) Inventors: Deepak Gajanana, Diemen (NL); Yorgos Christoforou, Arnhem (NL)

(73) Assignee: ST-Ericsson SA, Plan-les Ouates (CH)

( * ) Notice: Subject to any disclaimer, the term of this patent is extended or adjusted under 35 U.S.C. 154(b) by 255 days.

(21) Appl. No.: 12/735,202

(22) PCT Filed: Dec. 19, 2008

(86) PCT No.: PCT/EP2008/068080
§ 371 (c)(1),
(2), (4) Date: Jan. 10, 2011

(87) PCT Pub. No.: WO2009/080777
PCT Pub. Date: Jul. 2, 2009

(65) Prior Publication Data
US 2011/0101947 A1    May 5, 2011

(30) Foreign Application Priority Data
Dec. 21, 2007  (EP) .................................. 07123925

(51) Int. Cl.
*H02H 3/00*    (2006.01)
*H02H 3/20*    (2006.01)
(52) U.S. Cl.
USPC ................................ 361/56; 361/91; 361/111
(58) Field of Classification Search
USPC .............................................. 361/56, 91, 111
See application file for complete search history.

(56) References Cited

U.S. PATENT DOCUMENTS

| 4,672,303 | A |   | 6/1987  | Newton              |
|-----------|---|---|---------|---------------------|
| 5,731,731 | A |   | 3/1998  | Wilcox et al.       |
| 5,946,177 | A | * | 8/1999  | Miller et al. ........... 361/56 |
| 5,995,354 | A | * | 11/1999 | Yu .................... 361/111 |
| 6,028,755 | A |   | 2/2000  | Saeki et al.        |

(Continued)

FOREIGN PATENT DOCUMENTS

WO    WO 2007/046015 A1    4/2007

OTHER PUBLICATIONS

International Search Report dated Jun. 19, 2009 in connection with PCT Patent Application No. PCT/EP2008/068080.

(Continued)

*Primary Examiner* — Bao Q Vu
(74) *Attorney, Agent, or Firm* — Coats & Bennett, P.L.L.C.

(57) ABSTRACT

An integrated circuit (10) for use in a DC-DC converter is protected against damage from electrostatic discharge when not in use in the DC-DC converter. The integrated circuit includes a control circuit (11) and a switching transistor (12, 20) coupled between a first and second terminal (10a, b) of the integrated circuit (10). During DC-DC conversion the control circuit controls periodic switching of the switching transistor. The integrated circuit (10) furthermore comprises an electrostatic discharge (ESD) protection circuit, with a high pass filter circuit (160, 162) with inputs between terminals (10a, b) of the integrated circuit (10) and an output coupled to a detector transistor (164). The detector transistor (164) charges a chargeable circuit (17). From a node between the detector transistor (164) and the chargeable circuit (17) the switching transistor (12, 20) is made conductive when the detector transistor (164) becomes conductive. By using a high pass filter circuit (160, 162) the ESD protection circuit is made to work outside normal use. When the DC-DC converter contains multiple switching transistors all are preferably made conductive upon detection of ESD.

7 Claims, 2 Drawing Sheets

(56) References Cited

U.S. PATENT DOCUMENTS

| | | |
|---|---|---|
| 7,102,862 B1 | 9/2006 | Lien et al. |
| 7,382,592 B2 * | 6/2008 | Chen et al. ................... 361/56 |
| 7,495,878 B2 * | 2/2009 | Todd ............................. 361/111 |
| 7,876,540 B2 * | 1/2011 | Deval et al. ................... 361/56 |
| 7,885,047 B2 * | 2/2011 | Deval et al. ................... 361/56 |
| 2004/0125521 A1 * | 7/2004 | Salling et al. ................. 361/56 |
| 2006/0072267 A1 * | 4/2006 | Chatty et al. ................. 361/91.1 |
| 2007/0285854 A1 * | 12/2007 | Rodgers et al. ............... 361/56 |

OTHER PUBLICATIONS

Written Opinion of the International Searching Authority dated Jun. 19, 2009 in connection with PCT Patent Application No. PCT/EP2008/068080.

Cynthia A. Torres, et al., "Modular, portable, and easily simulated ESD protection networks for advanced CMOS technologies", Microelectronics Reliability, vol. 42, No. 6, Jun. 30, 2002, p. 873-885.

* cited by examiner

INTEGRATED CIRCUIT WITH DC-DC CONVERTER AND ESD PROTECTION

CROSS-REFERENCE TO RELATED APPLICATION(S)

The present application claims priority under 35 U.S.C. §365 to International Patent Application No. PCT/EP2008/068080 filed Dec. 19, 2008, entitled "INTEGRATED CIRCUIT WITH A DC-DC CONVERTER". International Patent Application No. PCT/EP2008/068080 claims priority under 35 U.S.C. §365 and/or 35 U.S.C. §119(a) to European Patent Application No. 07123925.5 filed Dec. 21, 2007 and which are incorporated herein by reference into the present disclosure as if fully set forth herein.

FIELD OF THE INVENTION

The invention relates to an integrated circuit that comprises DC-DC converter circuitry.

BACKGROUND OF THE INVENTION

A DC-DC converter may be used when circuitry in an integrated circuit needs a special power supply voltage. The DC-DC converter uses an inductor and transistor switches to connect and disconnect the inductor temporarily to and from different power supply terminals, in order to generate the special supply voltage. The transistor switches of the DC-DC converter may be integrated in an integrated circuit, together with control circuits of the DC-DC converter. Not all circuitry of the DC-DC converter needs to be integrated. Often the inductors of the DC-DC converter are discrete components outside the integrated circuit.

U.S. Pat. No. 6,028,755 discloses an example of a DC-DC converter. This converter comprises a first transistor switch coupled between one terminal of an inductor and ground and a second transistor switch coupled between said one terminal and a supply input.

In addition, the converter comprises a control circuit, with outputs coupled to the gates of the transistor switches. This control circuit regulates the output voltage, by controlling the time points at which the switches are switched on and/off. In addition the control circuit provides for over-voltage protection of capacitors of the DC-DC converter.

Circuits are provided that compare divided down versions of the input and output voltages with reference voltages and make the transistor switches conductive, to short circuit the power supply in the case of an over-voltage.

U.S. Pat. No. 4,672,303 similarly shows a DC-DC converter with an over-voltage protection circuit. Herein the divided down version of the output voltage is compared with a reference voltage and used to short circuit the power supply in the case of an overvoltage.

The transistor switches of a DC-DC converter have to carry considerable currents. As a result, transistor switches must be used that take up considerable circuit area in the integrated circuit. This problem is exacerbated by the fact that the transistor switches are connected to output terminals of the integrated circuit, which means that special, larger area transistors must be used in order to protect against damage by electrostatic discharge (ESD) during transport and handling of the integrated circuit, before it is mounted in a circuit.

SUMMARY OF THE INVENTION

Among others, it is an object to reduce the integrated circuit area needed for circuitry of a DC-DC converter.

An integrated circuit according to claim 1 is provided for. Herein a high pass circuit is used to trigger charging of a chargeable circuit when an ESD pulse occurs. The chargeable circuit controls a logic circuit to make a switching transistor of the DC-DC converter conductive. Thus ESD protection is provided for, even if the integrated circuit has not yet been mounted in a circuit. The switching transistor for DC-DC conversion is also used to provide for this ESD protection, so that no, or less, additional circuit area needs to be sacrificed for a discharge transistor.

BRIEF DESCRIPTION OF THE DRAWINGS

These and other objects and advantageous aspects will become apparent from a description of exemplary embodiments, using the following figures.

DETAILED DESCRIPTION OF EXEMPLARY EMBODIMENTS

Figure 1:
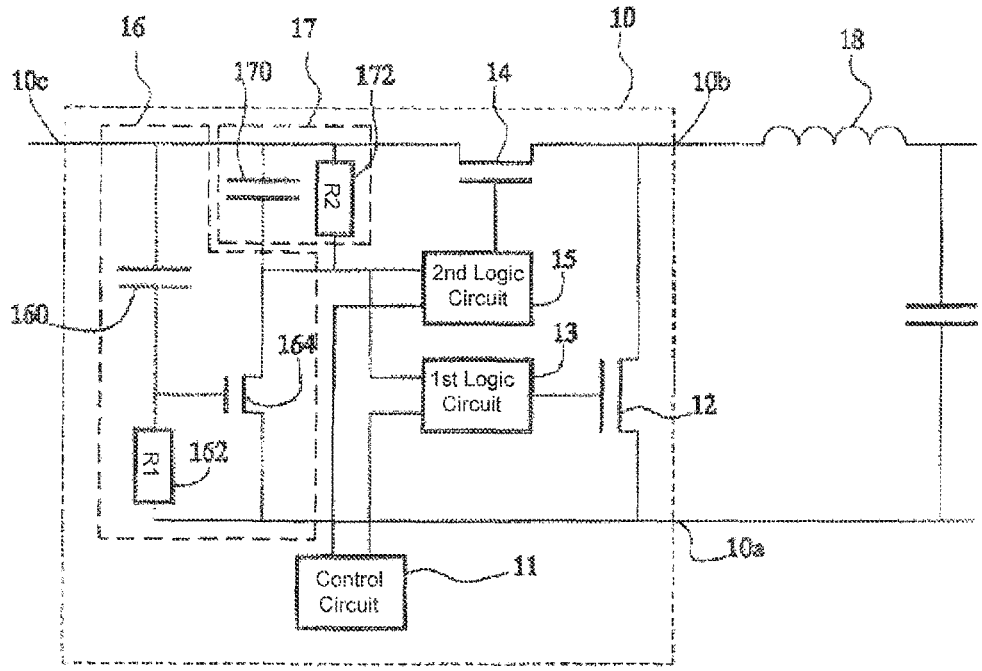
FIG. 1 shows an integrated circuit with DC-DC converter circuitry

FIG. 1 shows a DC-DC converter, wherein part of the DC-DC converter circuitry is included in an integrated circuit 10. In addition the DC-DC converter comprises a capacitor and an inductor 18, which are coupled to integrated circuit 10. Prior to assembly, integrated circuit 10 may be handled separately, i.e. without being connected to the capacitor and/or inductor 18.

Integrated circuit 10 comprises a control circuit 11, a first switching transistor 12, a second switching transistor 14, first and second logic circuits 13, 15, an ESD detector circuit 16 and a chargeable circuit 17. Control circuit 11 may be any suitable DC-Du converter control circuit; such circuits are known per se. Control circuit 11 may have inputs (not shown) coupled to various parts of the DC-DC converter, to measure voltages and/or currents, from which it derives output control signals. Control circuit 11 has outputs coupled to first logic inputs of first and second logic circuits 13, 15.

First logic circuit 13 has an output coupled to the gate of first switching transistor 12. First switching transistor 12 has a main current channel coupled between a first and second terminal 10a,b of integrated circuit 10. Second logic circuit 15 has an output coupled to the gate of second switching transistor 14. Second switching transistor 14 has a main current channel coupled between second terminal 10b and a third terminal 10c of integrated circuit 10. First and second switching transistor 12,14 may be transistors of mutually opposite conductivity type, such as an NMOS and PMOS field effect transistor respectively, or a PMOS and NMOS field effect transistor, or similar transistors. First terminal 10a may be a ground terminal, coupled, among others, to the semi-conductor substrate part, or well, wherein first switching transistor 12 is realized. Third terminal 10c may be connected to the substrate part, or well, wherein second switching transistor 14 is realized. First switching transistor 12 and second switching transistor 14 may be "normally off" transistors, that is transistors with a threshold at a level such that they are not significantly conductive at zero gate-source voltage.

For normal operation integrated circuit 10 is assembled with external circuits, such as inductor 18, for example on a printed circuit board. When power is switched on, control circuit 11 becomes active and it controls on/off switching of first and second switching transistor 12, 14, to provide for DC-DC converter operation in any suitable way.

Because DC-DC converter operation is known per se, this will not be described.

Before integrated circuit 10 is assembled with other circuit elements, or after, when the power is not switched on, electrostatic discharge may lead to voltage pulses between the terminals of integrated circuit 10. When first switching transistor 12 is an NMOS transistor, it will short-circuit pulses where the voltage of second terminal 10b becomes negative relative to first terminal 10a, due to its intrinsic diodes. Similarly, when second transistor 14 is a PMOS transistor, negative pulses on third terminal 10c will be shorted. A problem arises when the voltage of second terminal 10b or third terminal 10c becomes positive relative to first terminal 10a (or negative in the case of transistors of opposite polarity). ESD detector circuit 16 is operative under these circumstances, in combination with chargeable circuit 17 and first and second logic circuits 13, 15 to protect against damage.

ESD detector circuit 16 is located within integrated circuit 10 and comprises a first capacitor 160, a first resistor 162 and a detection transistor 164. Chargeable circuit 17 is also located within integrated circuit 10 and comprises a second capacitor 170 and a second resistor 172. First capacitor 160 is coupled between third terminal 10c and a gate of detection transistor 164. First resistor 162 is coupled between the gate of detection transistor 164 and first terminal 10a. As may be noted first capacitor 160 and first resistor 162 together form a differentiator circuit. Detection transistor 164 is a "normally off" transistor, which conducts no significant current at zero voltage between its gate and first terminal 10a. In embodiments wherein first switching transistor 12 is an NMOS transistor and PMOS transistor respectively, detection transistor 164 may be an NMOS transistor and a PMOS transistor respectively.

Second capacitor 170 and second resistor 172 are coupled in parallel between third terminal 10c and a drain of detection transistor 164. A source of detection transistor 164 is coupled to first terminal 10a. The drain of detection transistor 164 is coupled to second inputs of logic circuits 13, 15. Logic circuits 13, 15 may comprise conventional logic gates, comprising first transistors with main current channels coupled in series or in parallel between output nodes and first terminal 10a and second transistors with main current channels coupled in series or in parallel between the output nodes and third terminal 10c, the first and second transistors being of mutually opposite conductivity type, the inputs of the logic circuit being coupled to the control electrodes of the transistors.

In operation to protect against electrostatic discharge (ESD), ESD detector circuit 16 responds to fast rising voltage differences between first terminal 10a and third terminal 10c, due to ESD. In an embodiment first capacitor 160 and first resistor 162 have resistance and capacitance values that result in an RC time of ten nanoseconds. In an embodiment, the resistance and capacitance values are selected so that the RC time is shorter than the rise time of any signals that occur as part of normal operation of the DC-DC converter. This has the effect that ESD detector circuit 16 performs no function in normal operation, when a power supply is connected to integrated circuit.

In an embodiment wherein first switching transistor 12 is an NMOS transistor, when there is a sufficiently fast rise in the voltage difference between first terminal 10a and third terminal 10c, due to ESD, first capacitor 160 and first resistor 162 make the gate voltage of detection transistor 164 rise above the threshold voltage of detection transistor 164. As a result the voltage at the drain of detection transistor 164 is pulled to the voltage of first terminal 10a and second capacitor 170 is charged to about the voltage between first terminal 10a and third terminal 10c. After the fast rise, the ESD induced voltage difference between first terminal 10a and third terminal 10c typically drops off more slowly, for example in one microsecond. Second capacitor 170 and second resistor 172 have resistance and capacitance values that result in an RC time of this order or larger, for example of one microsecond. Due to the fast differentiating response of first capacitor 160 and first resistor 162, detection transistor 164 becomes non-conductive in this time period. Second capacitor 170 then retains a voltage difference between third terminal 10c and the second inputs of logic circuits 13, 15.

Logic circuits 13, 15 function both when a normal power supply is available between first and third terminal 10a,c and with a voltage due to ESD instead of a power supply voltage. In the latter case, when a voltage has developed over second capacitor 170 and second resistor 172, the voltage due to charge on second capacitor 170 is used as input to the logic circuits 13, 15. First logic circuit 13 couples the gate and the source of first switching transistor 12 to the third terminal 10c. Thus this voltage is raised above its threshold level both when control circuit 11 provides a signal to do so and after detection transistor 164 is made conductive, provided that a sufficient voltage difference is present between the first and third terminal 10a,c which is the case typically during normal operation or after an ESD pulse respectively (the source of second switching transistor 14 is coupled to first terminal 10a). Similarly, second logic circuit 15 couples the gate of second switching transistor 14 to the first terminal 10a. This raises the voltage between the source and the gate of second switching transistor 14 above its threshold level, both when control circuit 11 provides a signal to do so and after detection transistor 164 is made conductive, provided that a sufficient voltage difference is present between the first and third terminal 13a,c, which is the case typically during normal operation or after an ESD pulse respectively (the source of second switching transistor 14 is coupled to third terminal 10c).

In this way both first and second switching transistor 12, 14 are made conductive in response to a fast rising voltage difference between first terminal 10a and third terminal 10c, and they remain conductive during a time period determined by second capacitor 170 and second resistor 172, provided that a sufficient voltage difference exists between first and second terminal 10a, c. Thus, excess ESD-caused charge differences are removed between first terminal 10a and third terminal 10c.

It should be noted that in normal operation it is usually undesirable to make both first and second switching transistor 12, 14 conductive at the same time, because this results in a short-circuit of the power supply through the transistors, with possible damaging effects on the power supply and the transistors. In normal operation the gate voltages of first and second switching transistor 12, 14 are controlled by control circuit 11. Under control of control circuit 11 at most one of first and second switching transistor 12, 14 is made conductive at the time. Preferably, logic circuits 13, 15 are structured to provide for break before make operation to exclude overlap when switching between states wherein first and second switching transistor 12, 14 are conductive.

However in response to ESD detection circuit 16 both first and second switching transistor 12, 14 are made conductive at the same time. In normal operation ESD detection circuit 16 need not become active, because it responds only to very fast ESD pulses.

It may be noted that as a result of intrinsic properties of transistors, unusual ESD voltages at second terminal 10b will lead to current to first terminal 10a or third terminal 10c, through the substrate of first switching transistor 12 or second switching transistor 14. As a result, it may suffice to provide an ESD detector circuit 16 as shown, for ESD pulses of one polarity, coupled directly between first terminal 10a and third terminal 10c and indirectly to second terminal 10b, via third terminal 10c and second switching transistor 14.

It is preferred to use the detector circuit 16 connected to the input side of second switching transistor 14. As an alternative, or in addition, a detector circuit may be provided (not shown), like ESD detector circuit 16, but coupled directly between first terminal 10a and second terminal 10b. This has the disadvantage that more high frequency signals will be present at the input of the detector during normal use, with the risk of false detection. A more complex high pass filter may be needed, to detect only ESD pulses. Or a disable input would be needed for disabling the detector when normal use is detected, with the risk of disabling some ESD detection. With such a detector directly between first terminal 10a and second terminal 10b, the transistors of logic circuits 13, 15 that are controlled by the additional detector may have their main current channel coupled to second terminal 10b instead of third terminal 10c. This ensures that more charge will be removed. The other transistors in logic circuits 13, 15 that have their main current channel coupled to third terminal 10c may be kept coupled to third terminal 10c, so that normal operation is not disturbed. Also a shared detector circuit may be used with front-end inputs that are coupled directly to both second terminal 10b and third terminal 10c, respectively.

Although an embodiment has been shown wherein first switching transistor 12 and second switching transistor 14 are made conductive together in response to detection of an ESD pulse between third terminal 10c and first terminal 10a, it should be noted that alternatively only first switching transistor 12 may be made conductive in response to an ESD pulse between second terminal 10b and first terminal 10a, when a detector circuit is provided to detect pulses between these terminals. An additional switching transistor (not shown) with a main current channel coupled between third terminal 10c and first terminal 10a may be provided, with a gate coupled to a detector circuit for detecting ESD pulses between third terminal 10c and first terminal 10a. Thus, this additional transistor may be made conductive in response to an ESD pulse between third terminal 10c and first terminal 10a.

Although operation has been described for an example wherein first switching transistor 12 is an NMOS transistor and second switching transistor 14 is a PMOS transistor, of course first switching transistor 12 may be a PMOS transistor and second switching transistor 14 may be a PMOS transistor. In this case detection transistor 164 may be a PMOS transistor as well. In this case the same operation occurs, except that events occur at inverted polarities of the voltage differences.

It should be appreciated that the detection circuit 16 may be implemented in many alternative ways. For example, instead of a differentiating circuit with a minimum number of components such as shown in the figure, any network of resistances and capacitors with a high pass characteristic may be used. Similarly, instead of a single detection transistor 164, a combination of transistors may be used and instead of second capacitor 170 and second resistor 172 any load circuit may be used that allows a voltage to be developed in response to current from the detection transistor 164. For example, a series arrangement of a plurality of resistors could be used, to provide for a high resistor value. Instead of logic circuits 13, 15, circuits with different functionality may be used, for example if the logically inverted signals are supplied from control circuit 11 during normal operation, or if logic circuits 13, 15 are used also for performing other logic functions using further logic inputs, for example as part of the logic function of control circuit 11.

Figure 2:
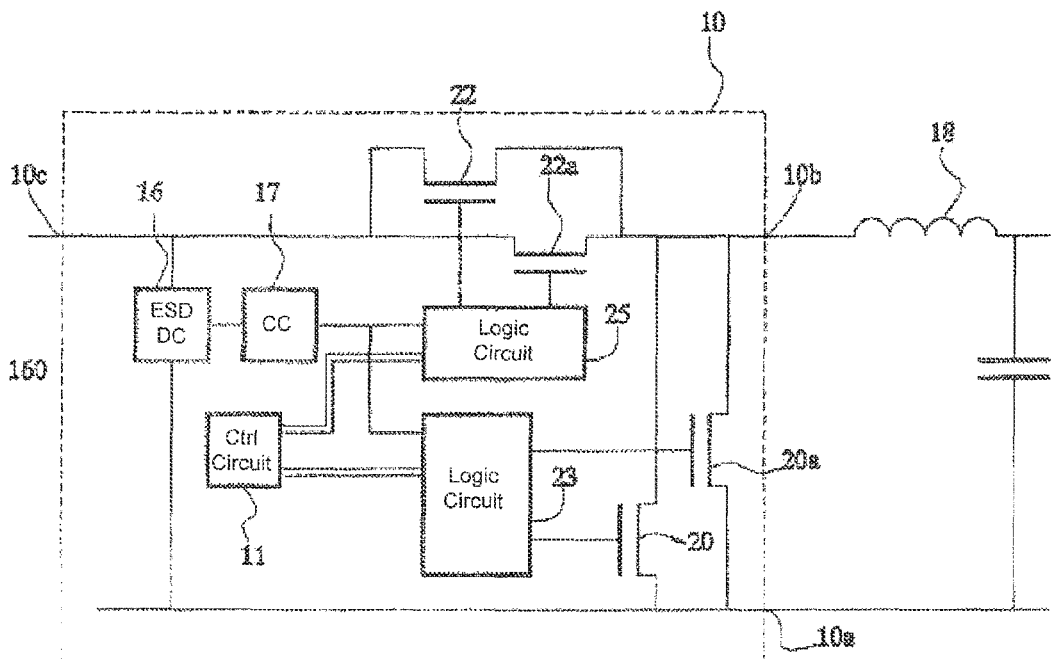
FIG. 2 shows DC-DC converter circuitry

FIG. 2 shows DC-DC converter circuitry wherein the first and second transistor have each been replaced by a plurality of switching transistors 20, 20a, 22, 22a with parallel main conduction channels. By way of example two transistors are shown, but more may be used. In normal operation control circuit 11 controls individual switching of different transistors of each plurality via logic circuits 23, 25. This is known per se, and it may be used in the operation of the DC-DC converter for example to select the impedance with which terminals 10a-c are coupled to each other.

In order to handle ESD pulses logic circuits 23, 25 overrule any (spurious) signals from control circuit and make all switching transistors 20, 20a, 22, 22a, conductive in response to detection of an ESD pulse.

Figure 3:
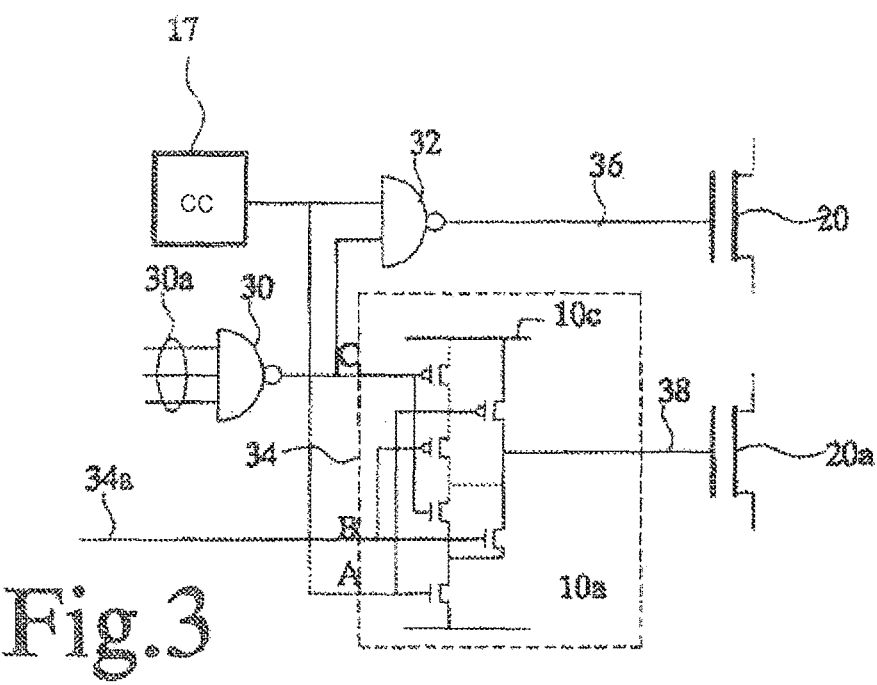
FIGS. 3,4 show logic circuits
Figure 4:
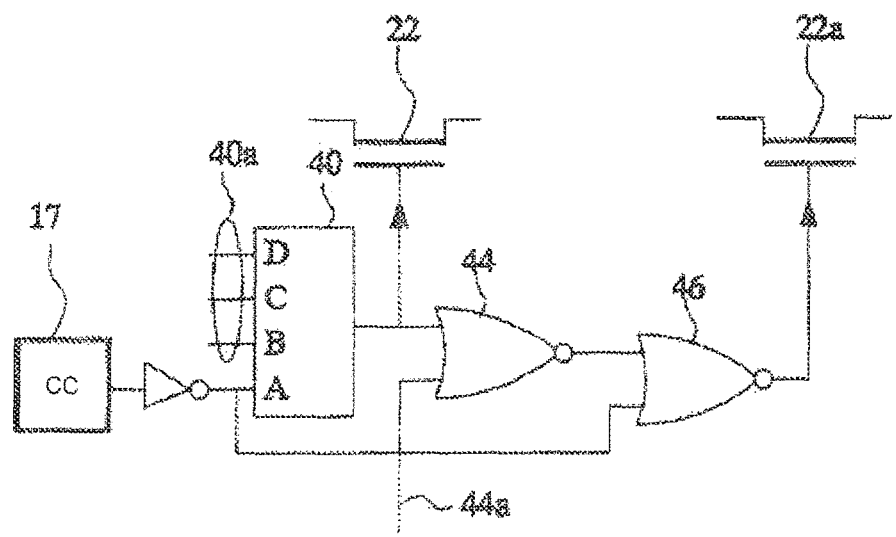

FIGS. 3 and 4 show embodiments of logic circuits 23, 25. FIG. 3 shows a logic circuit for controlling first switching transistors 20, 20a. The logic circuit contains a first and second NAND gate 30, 32 and a compound logic circuit 34 for forming a logic function NAND(A,OR(B,C)) of its logic input signals A, B, C. By way of example the transistor structure of compound logic circuit 34 is shown. The positive and negative power supply of NAND gates 30, 32 and compound logic circuit 34 are coupled to first and third terminal 10a,c. The input signals of first NAND gate 30 are provided by the control circuit (not shown). Accordingly first NAND gate 30 could be regarded as part of the control circuit.

It should be noted that ESD detection overrules the distinct in control of first and second one of the first switching transistors 20, 20a that is used in normal operation. As to the first one of the first switching transistors 20, the gate voltage of the first one of the first switching transistors 20 depends on the output signal of first NAND gate 30. The gate voltage of a first one of the first switching transistors 20 is supplied at an output 36 by second NAND gate 32 as a NAND of the output signal of first NAND gate 30 and the signal formed by ESD detector circuit 16 and chargeable circuit 17. Thus the gate of the first one of the first switching transistors 20 is coupled to third terminal 10c via a transistor (not shown) in second NAND gate 32 when the signal from the chargeable circuit 17 is low relative to third terminal 10c. In normal operation chargeable circuit 17 outputs a logic high. In this case the gate voltage of the first one of the first switching transistors 20 depends on the output signal of first NAND gate 30.

As to the second one of the first switching transistors 20a, the gate voltage of a second one of the first switching transistors 20a is supplied at an output 38 by compound logic circuit 34. In normal operation an additional signal from the control circuit at an input 34a of the compound logic circuit is needed, in addition to the signal from first NAND gate 30, to drive the gate of the second one of the first switching transistors 20a high. Upon ESD detection the gate of the second one of the first switching transistors 20a is coupled to third terminal 10c via transistors in compound logic circuit 34 when the signal from the chargeable circuit 17 is low relative to third terminal 10c.

Furthermore the advantageous aspect may be noted that the output from the chargeable circuit is used to control the final logic stages that are coupled to the gate of the switching transistors 20. Thus a fast response and independence from spurious signals is realized. Control of earlier stages is also possible, but is less effective.

FIG. 4 shows a logic circuit for controlling second switching transistors 22, 22a. The logic circuit contains a first and second NOR gate 44, 46 and a compound logic circuit 40. The positive and negative power supply of NOR gates 44, 46 and compound logic circuit 40 are coupled to first and third terminal 10*a,c*. Compound logic circuit 40 is structured to form a logic function NOR(A,AND(B,C,D)) of its logic input signals A, B, C, D. The input signals B, C, D come from the control circuit (not shown) and the input signal A is obtained by logically inverting the signal from the chargeable circuit 17. The output 48*a* of compound logic circuit 40 is coupled to the gate of a first one of the second switching transistors 22. Thus, a logic low signal at the output of chargeable circuit 17 causes a transistor (not shown) in compound logic circuit 40 to couple the gate of the gate of a first one of the second switching transistors 22 to first terminal 10*a*. The output of compound logic circuit 40 is coupled via a series arrangement of first and second NOR gate 44, 46 to the gate of a second one of the second switching transistors 22*a* at an output 48*b*.

First NOR gate 44 has an input 44*a* coupled to an output of the control circuit for an additional signal to disable driving of the second one of the second switching transistors 22*a*. Second NOR gate 46 has an input coupled to the chargeable circuit, via an inverter. Thus, a logic low at the output of the chargeable circuit due to ESD detection causes a transistor (not shown) in second NOR gate 46 to couple the gate of the second one of the second switching transistors 22*a* to first terminal 10*a*.

Again the output from the chargeable circuit is used to control the final logic stages that are coupled to the gate of the second switching transistors 22*a*. Thus a fast response and independence from spurious signals is realized.

As will be realized, the structure of logic circuits 13, 15 of the embodiment of FIG. 1 may be similar, except that only one output is needed for first output transistor 12 and one for second switching transistor 14. Also, of course different implementations of similar logic functions may be used, or a different logic dependence on a signal or signals from control circuit 11 may be used.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An integrated circuit, comprising circuitry of a DC-DC converter, the circuitry of the DC-DC converter including a control circuit and a switching transistor coupled between a first and second terminal of the integrated circuit the integrated circuit furthermore comprising an electrostatic discharge protection circuit, the electrostatic discharge protection circuit comprising:
    a high pass filter circuit having an output and having inputs coupled between the first and second terminal;
    a detector transistor with a control electrode coupled to the output of the high pass filter circuit and a main current channel;
    a chargeable circuit coupled in series with the main current channel between the first and second terminal; and
    a logic circuit with a logic input coupled to a node between the main current channel of the detector transistor and the chargeable circuit and a further logic input coupled to an output of the control circuit, the logic circuit having an output coupled to a control electrode of the switching transistor, the logic circuit having a logic function that makes the switching transistor conductive when the detector transistor becomes conductive.

2. An integrated circuit according to claim 1, comprising:
    a further switching transistor with a main current channel coupled between the second terminal and a third terminal of the integrated circuit, the switching transistor and the further switching transistor having mutually opposite polarity; and
    a further logic circuit coupled between said node and a control electrode of the further switching transistor, the further logic circuit having a logic function that makes the further switching transistor conductive when the detector transistor becomes conductive.

3. An integrated circuit according to claim 2, wherein the logic circuit and the further logic circuit have power supply inputs coupled to the first and third terminal respectively.

4. An integrated circuit according to claim 1, comprising an additional switching transistor, the switching transistor and the additional switching transistor having main current channels coupled in parallel, the logic circuit having inputs for switching off the switching transistor and the additional switching transistor individually, the logic circuit being configured to make both the switching transistor and the additional switching transistor conductive when the detector transistor becomes conductive.

5. An integrated circuit according to claim 1, wherein a cut-off frequency of the high pass filter circuit is at least so high that the high pass filter circuit blocks all signals produced in response to any signal produced by the control circuit in normal operation of the integrated circuit.

6. An integrated circuit according to claim 5, comprising a further switching transistor with a main current channel coupled between the second terminal and a third terminal of the integrated circuit, the third terminal for serving as a power supply input of the integrated circuit for DC-DC conversion operation, and wherein the high pass filter circuit and the series arrangement of the chargeable circuit and the main current channel of the detector transistor are each coupled in series between the first and third terminal and to the second terminal via the main current channel of the further switching transistor.

7. An integrated circuit according to claim 1, wherein the logic circuit comprises a logic transistor with a main current channel coupled between the control electrode of the switching transistor and a supply node that is coupled directly or indirectly to the second terminal, the logic transistor having a control electrode coupled to the node between the main current channel of the detector transistor and the chargeable circuit, so that a voltage at the control electrode of the logic transistor is a one to one function of a logic level of the node between the main current channel of the detector transistor and the chargeable circuit.

* * * * *